2,976,793

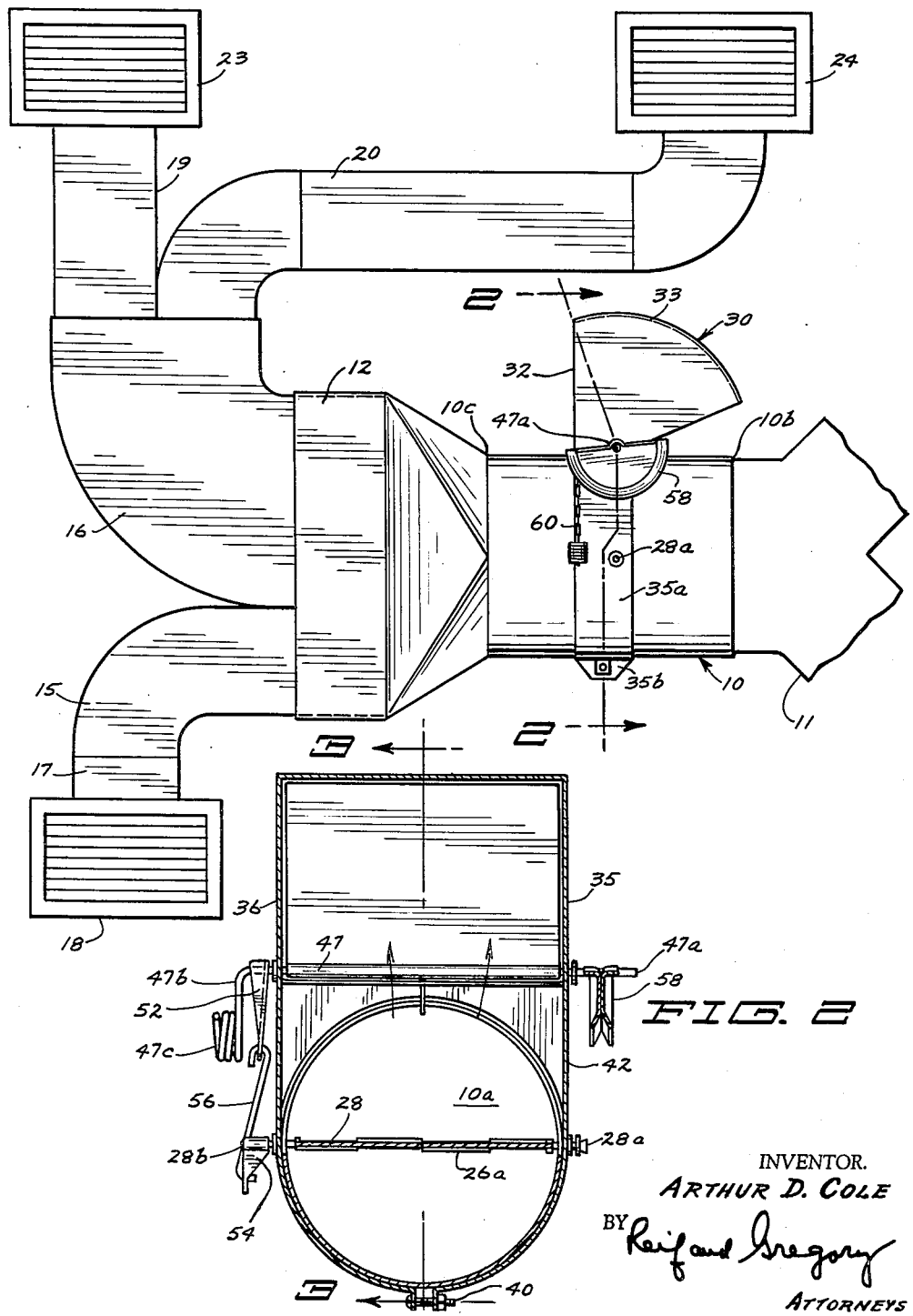
March 28, 1961 A. D. COLE 2,976,793
AIR PRESSURE REGULATOR FOR AIR CONVEYING CONDUITS
Filed Jan. 16, 1958 2 Sheets-Sheet 1
INVENTOR.
ARTHUR D. COLE
ATTORNEYS March 28, 1961 A. D. COLE 2,976,793
AIR PRESSURE REGULATOR FOR AIR CONVEYING CONDUITS
Filed Jan. 16, 1958 2 Sheets-Sheet 2
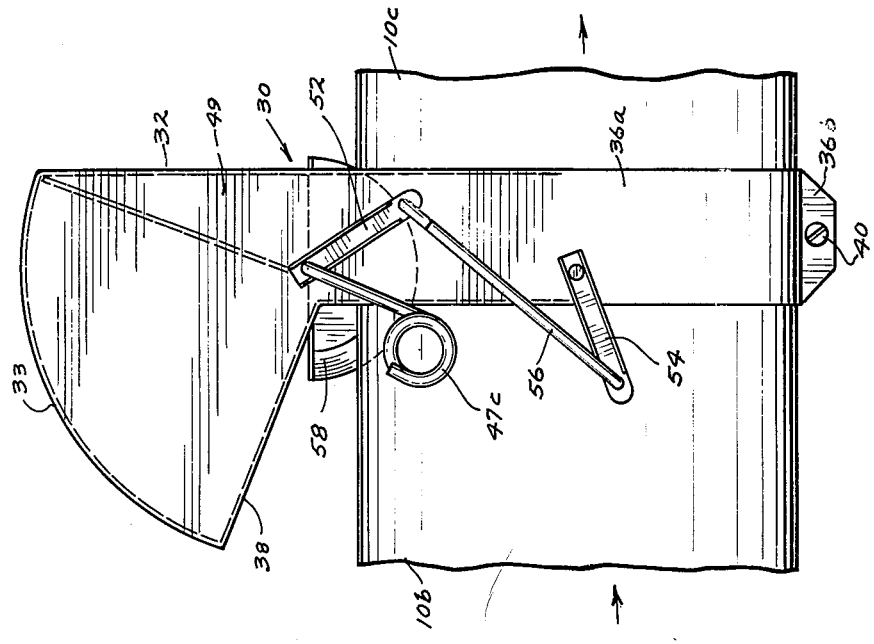
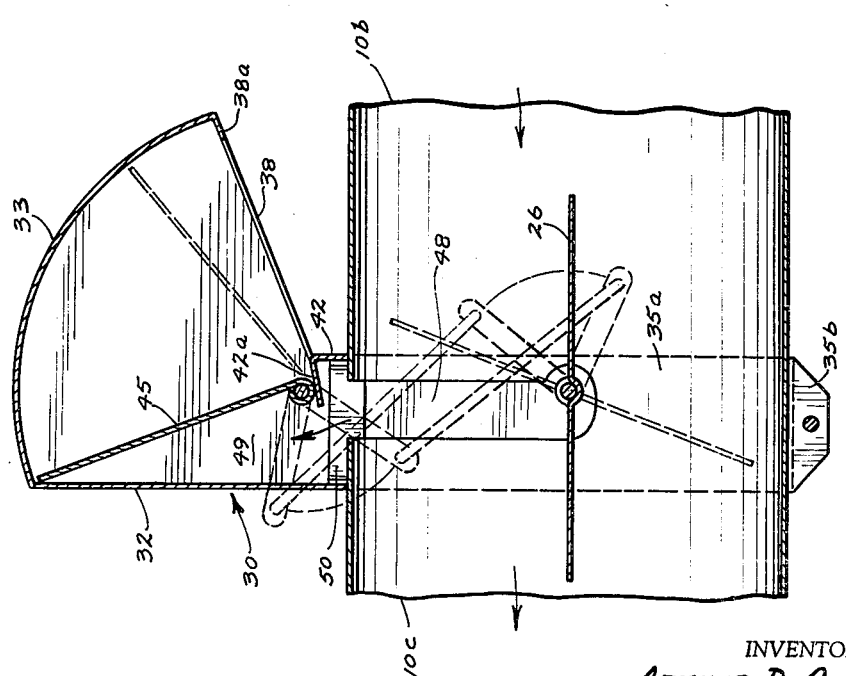
INVENTOR.
ARTHUR D. COLE
BY
ATTORNEYS

United States Patent Office 2,976,793
Patented Mar. 28, 1961

AIR PRESSURE REGULATOR FOR AIR CONVEYING CONDUITS

Arthur D. Cole, % Cole-Sewell Engineering Co., 2288 University Ave., St. Paul 14, Minn.

Filed Jan. 16, 1958, Ser. No. 709,241

1 Claim. (Cl. 98—33)

This invention relates to an air pressure regulator. It is desirable in air supply systems to provide air to maintain a desired pressure at a given point and to make the control means of said supply responsive to deviations or changes from said desired pressure. A common application of applicant's invention is found in air conditioning systems. In the present embodiment of applicant's invention reference is made to such a system. It is common in air conditioning systems to provide quantities of warm and cool air under pressure from separate sources to a mixing chamber or conduit where said quantities of air are merged to form a common mass of air of a desired temperature. Said cool air is also commonly used separately. Said air is then distributed under pressure from said conduit to a plurality of registers for heating or cooling various areas as the case may be.

There will be a sufficient supply of air flowing out from said conduit to provide a desirable quantity for each of the number of registers used in the system. It is particularly desirable to maintain a substantially constant degree of pressure against said registers. At times various of said registers may be closed. At such times with no reduction in the quantity of air supplied there is present a greater supply than is required for a normal flow through the open registers.

A reduction in the number of open registers without a corresponding reduction in the quantity of air supplied results in a greater than desired pressure of air against the open registers which adversely affects the desired flow of air through the open registers.

It is desirable therefore to have some means automatically responsive to changes in pressures at the registers with the opening and closing of said registers or any number of them for regulating the quantity of air supplied to said registers so that at all times the supply of air provided will correspond to the normal requirements of the opened registed and therefore maintain a substantially constant desired degree of pressure against the open registers.

It is an object therefore of this invention to provide an automatic control and regulation of an air supply in an air conditioning system having a plurality of registers to maintain a substantially constant degree of pressure against the open of said registers.

It is a further object of this invention to provide a device in an air conditioning system comprising a passage receiving a supply of air at one end thereof and having an outlet at its other end, a plurality of registers communicating with said outlet, and means for automatically controlling and regulating the supply of air to said registers to have said supply of air correspond to the normal requirements for the opened of said registers.

It is a more specific object of this invention to provide a device in an air conditioning system comprising a conduit for receiving a supply of air at one end and having an outlet for said supply of air at its other end, a plurality of registers communicating with said outlet, a damper in said conduit, and means responsive to variations in air pressure connected to said damper to move the same whereby said means responsive to a change in air pressure at said outlet when some of said registers are closed responds to said change in pressure by moving said damper to partially restrict the passage in said conduit whereby the total air supply will be reduced proportional to the number of registers closed and a desired normal supply of air will be provided for the open registers and a substantially constant certain degree of pressure will be maintained at said registers which are open.

It is a still more specific object of this invention to provide a device in an air conditioning system comprising a conduit having an inlet for an air supply at one end and having an outlet at its other end, a plurality of registers connected to said outlet end, a damper in said conduit normally in open position, a vane housing adjacent said conduit, an opening in said conduit at the outlet side of said damper when in closed position communicating with said housing, a vane in said housing, said vane being connected to said damper, means for stabilizing said vane in one position at a certain degree of pressure at said registers when all of said registers are open to hold said damper open, said vane being responsive to a change in air pressure at said registers as reflected in the back pressure therefrom when some of said registers are closed whereby said vane is moved by the resulting increase in said back pressure and causes said damper to be moved to restrict the passage in said conduit whereby said air supply is reduced to an amount proportional to the number of registers which are open to maintain said desired certain degree of pressure at said open registers, which pressure stabilizes said vane in its new position.

These and other objects and advantages of the invention will be fully set forth in the following description made in connection with the accompanying drawings in which like reference characters refer to similar parts throughout the several views and in which:

Fig. 1 is a view of applicant's device in side elevation indicating a system of conduits extending from either end thereof;

Fig. 2 is a view in transverse vertical section on an enlarged scale taken on line 2—2 of Fig. 1 as indicated by the arrows;

Fig. 3 is a broken view in longitudinal vertical section on an enlarged scale taken on line 3—3 of Fig. 2 as indicated by the arrows with changes in positions of some parts shown in dotted line; and Fig. 4 is a broken view in side elevation oppositely that shown in Fig. 1 on an enlarged scale with a portion thereof shown in dotted line.

Referring to the drawings, applicant's device comprises a conduit 10 having a passage 10a running therethrough. Said conduit may be variously shaped, but in the embodiment of the invention here disclosed it is shown to be cylindrical in form and of a suitable length. Said conduit will be connected at its inlet end 10b to a supply of air under pressure. In the present embodiment of applicant's invention, it is shown having a Y coupling 11 connected thereto and said coupling will be connected to sources of warm and cool air which will merge in said coupling and in said conduit. Said warm and cool air will be supplied in predetermined relative quantities to provide mixed air of a desirable temperature. Said air will be moved under suitable pressure. In an air cooling system, said conduit 10 will be connected to a supply of cool air only, or if desired as in the above described system, the supply of warm air may be cut off.

Communicating with the other or outlet end 10c of said conduit 10 are a plurality of registers which may be of any desired number but which for purposes of illustration are here shown to be three in number.

Connected to the other or outlet end 10c of said conduit 10 is an enlarged adapter 12 having L members 15 and 16 leading outwardly therefrom. Connected to said L member 15 is a conduit 17 running to an outlet or air register 18. Said L member 16 is here shown having a plurality of conduits 19 and 20 running therefrom and being respectively connected to outlets or air registers 23 and 24. In practice any desired number of outlets or registers may be in communication with said outlet end 10b, but for purposes of illustration these are here shown to be three in number.

Mounted in said conduit 10 substantially centrally longitudinally thereof is a passage restricting member 26 shown here in the form of a damper of substantially the same transverse dimension as that of said passage 10a. Said damper is here shown mounted centrally on a pivot 28. Said pivot is shown here to be rod-like in form having its ends 28a and 28b extending outwardly of said conduit 10 at either side thereof. While said pivot 28 may be secured in various ways to said damper 26, it is here shown disposed through and secured in a passage 26a formed diametrically of said damper by having alternate semi-circular portions punched outwardly at either side of said damper and thus forming said passage.

Carried on said conduit 10 is a vane housing 30 having an upper portion having an upstanding rear side 32 having its bottom curved to fit about the upper portion of said conduit 10, having an arcuate-shaped top portion 33 curved forwardly from said rear side and having closed sides 35 and 36. Said upper portion as here illustrated has an open front 38 having a right-angled flange 38a of small width along the sides and across the top thereof. The lower portion of said housing 30 is in the form of a saddle clamp with said sides 35 and 36 being reduced in width to strap-like portions 35a and 36a extending downwardly about said conduit 10 and having their adjacent free ends apertured and bent outwardly at right angles to form flanges 35b and 36b with a nutted bolt 40 disposed therethrough and tightened to hold said housing 30 securely in position on said conduit 10. A lower front wall 42 is provided just below said open front 38 having a bottom portion curved to fit about the upper portion of said conduit 10. Said rear side 32 and front wall 42 are integral with said sides 35 and 36 and said lower side portions 35a and 36a. Said front wall has an inwardly extending flange 42a along its upper edge. The side portions 35a and 36a are apertured to permit said pivot 28 to have its end portions extend therethrough.

Disposed in said upper portion of housing 30 is a vane 45 here shown having its lower edge curved about and secured to a pivot shaft 47, said shaft having its ends 47a and 47b extend outwardly respectively of said sides 35 and 36. Said shaft extends through said sides at points whereby the bottom edge of said vane 45 rests on said flange 42a and is pivotable thereon. Said vane 45 is here shown having a width substantially the width of said upper portion of said housing 30 and having a height to reach a point closely adjacent the top 33. Thus the upper portion of said housing 30 forms a chamber 49 having in effect a pivoted front side formed by said vane 45.

A transverse opening 48 is provided in the upper portion of said conduit 10 in an area which said housing 30 overlies for communication between the passage in said conduit 10 and said chamber 49.

A positioning plate member 50 extends centrally between said rear side 32 and front wall 42 having a portion extending downwardly into said opening 48. Thus said housing 30 will always be positioned correctly on said conduit 10 in relation to said opening 48. Said opening 48 will be at the outlet side of said damper 26.

Referring to said shaft 47, its end 47b extends outwardly of said side 36 for a short distance and is bent at right angles to form an arm with the outer end thereof formed into a coil 47c. Secured to the upper portion of said arm 47b is an arm 52 and a similar arm 54 is secured to the outer end 28b of said pivot 28. Said arms 52 and 54 have apertured free ends. A link 56 pivotally connects said arms 52 and 54.

Thus by means of said arms 52 and 54 and connecting link 56, said vane 45 and said damper 26 are operationally connected. Said arms 52 and 54 are positioned so that when said vane 45 is at its extreme rearward position, said damper 26 will be in a horizontal or widest open position. Said coil 47c will be adjusted to put the moving parts comprising said vane 45, damper 26, arms 52 and 54, and link 56 into a balanced position.

Secured to end 47a of said shaft 47 is a grooved semi-circular pulley 58 of a common variety and carried thereby is a weighted chain 60 for regulating said vane 45. Said weight will be just sufficient to balance said vane and stabilize its position in relation to a certain degree of pressure at the open registers and the consequent back pressure against itself. Said vane will respond to variations in said back pressure and will move said damper to regulate the flow of air to maintain said certain degree of pressure at all times.

It is seen that the upper portion of said housing 30 forms a chamber in which the vane 45 in effect forms a movable front wall or side. It is also seen that said vane 45 has communication with the air pressure at the open registers and is responsive to changes in back pressure caused thereby.

In operation, air under pressure will be supplied to the conduit 11. Said air then will flow through said conduit 10 to the various registers here indicated as being 18, 23 and 24. It is desirable to have such a supply of air as will create a certain degree of pressure upon the open registers. In installing applicant's regulator, such as supply of air will be provided that for the entire system a certain degree of pressure will be maintained at each of the registers in open condition and a corresponding resulting degree of back pressure will be maintained in said chamber 49. With all registers open the vane 45 will be in its extreme rearward position which is in the direction of wall 32. It will be held in this position by the weighted chain 60. Said vane will be stabilized in this positon by said weighted chain in relation to the desired degree of air pressure against the open register. Said air pressure at the registers creates a back pressure which is communicated to said vane and to which pressure said vane is responsive in its movement. With all the registers open, said vane 45 through the arms 52 and 54 and link 56 will position and hold the damper 26 in its wide open position Fig. 3.

When one or more registers are closed, there will be more than a normal or desirable supply of air for the registers remaining open. Thus there will be a greater pressure of air than is desired at the open registers. Immediately a back pressure greater than that for which said vane 45 is adjusted results.

Said increased back pressure is immediately communicated to said chamber 49 and it will cause said vane 45 to move forwardly in said housing 30. Said vane 45 in turn by means of the arms 52 and 54 and link 56 will cause said damper 26 to move towards a vertical or closing position and thus restrict the opening in said passage 10a and reduce the quantity of air flowing through said conduit 10 to the open registers. The quantity of air will be reduced to the point where the desired pressure is had at the open registers. Said vane will be moved forwardly until the back pressure in chamber 49 resulting from the air pressure at the open registers is in balance with the weight on vane 45 and said vane will be stabilized in its new position. Thus more or less air is provided as more or less registers are open in proportion to the amount of air required when all registers are open with the desired degree of pressure at the open registers.

Thus it is seen that an automatic control is exercised to regulate the supply of air flowing to the open registers. The control members are actuated merely by the opening or closing of registers and the resulting changes in pressures at said registers as reflected by corresponding resulting back pressure in chamber 49 and thus said control members function automatically. There is a short lag of time between the closing of a register and the response of the control members 45 and 26 to the change in back pressure created thereby, but this lag is of no consequence.

When the supply of air flowing to the registers remaining open is reduced proportional to the number of registers open, the pressure at said open registers will be of the certain desired degree and said vane 45 will be stabilized in its new position with a corresponding movement of damper 26 to provide for the passage of such a supply of air.

As soon as the closed registers are opened, the supply of air will be momentarily inadequate. As a result the back air pressure at the inner side of said vane 45 will be quickly reduced. Said vane will then be moved in a counterclockwise direction as viewed in Fig. 3 to a more open position until the desired pressure at said registers is restored. Said vane will again be stabilized in its new position.

Thus it is seen that the air supply control and regulating members are actuated automatically by the demand for air supply by the number of registers in open condition at any given time and more specifically said control and regulating members are responsive to deviations in air pressure at the open registers by responding to resulting back pressures. The passage of air through conduit 10 does not affect vane 45. It is the direct effect of this air to create a pressure at the registers and the resulting back pressure therefrom affects the position of vane 45.

Thus it is seen that I have provided a very simple, effective and automatic control and regulation of a supply of air into an air conditioning system, particularly for maintaining constant air pressure against open registers with the control of the system being responsive to the back pressure resulting from the air pressure at the registers. Applicant's device has proved to be very successful in operation and is being produced on a commercial basis.

It will of course be understood that various changes may be made in the form, details, arrangement and proportions of the parts, without departing from the scope of applicant's invention, which, generally stated, consists in a device capable of carrying out the objects above set forth, in the parts and combinations of parts disclosed and defined in the appended claim.

What is claimed is:

An air supply system having in combination, a conduit for the passage of air therethrough, an inlet at one end of said conduit communicating with a source of air under pressure, an outlet at the other end of said conduit, a damper in said conduit normally in opened position, a plurality of registers, conduits respectively connecting said registers with said outlet for communication therebetween, a vane housing having an upstanding rear wall of some height, an upstanding front wall of substantially lesser height and depending side strap-like portions adapted to be disposed about said conduit for the removable mounting of said vane housing on said conduit substantially in vertical alinement with said damper, sector-shaped side portions forming sides for said front and rear walls of said vane housing and extending forwardly of the same, said side portions, having an open front, said conduit having an opening adjacent the side of said damper facing the outlet end of said conduit for direct and constant communication of air from the outlet end of said conduit with said vane housing, a vane in said vane housing, linkage connecting said vane and said damper and a balance means connected to said vane to stabilize the position of said vane in relation to a given magnitude of back pressure directly from said registers whereby said damper will be moved by said vane toward a given correspondingly closed position to permit the passage of an amount of air that will maintain the pressure at the registers constant and the resultant back pressure against said vane in said housing at a value to stabilize the new partially closed position of said vane.

References Cited in the file of this patent

UNITED STATES PATENTS

| | | |
|---|---|---|
| 2,191,141 | Grant | Feb. 20, 1940 |
| 2,232,981 | Swanson | Feb. 25, 1941 |
| 2,455,250 | Hillinan | Nov. 30, 1948 |
| 2,749,833 | Hekelaar | June 12, 1956 |
| 2,823,600 | Cole | Feb. 18, 1958 |